O. R. FYLER.
Churn.
No. 9,148. Patented July 27, 1852.
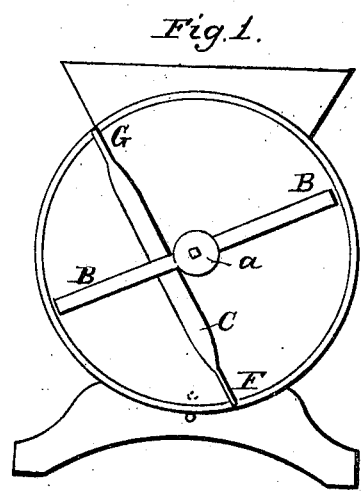
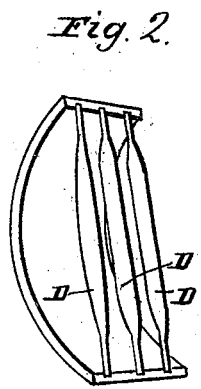
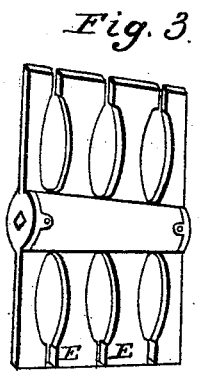
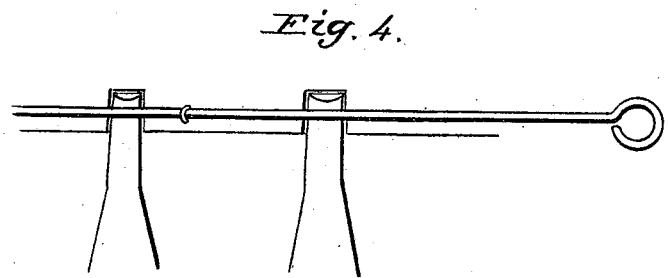

UNITED STATES PATENT OFFICE.

ORSAMUS R. FYLER, OF BRATTLEBORO, VERMONT.

CHURN AND BUTTER-WORKER.

Specification of Letters Patent No. 9,148, dated July 27, 1852.

*To all whom it may concern:*

Be it known that I, ORSAMUS R. FYLER, of Brattleboro, in the county of Windham and State of Vermont, have invented a new and Improved Mode of Churning and Working Butter by a Machine, which I call my "Butter-Working Churn"; and I do hereby declare that the following is a full and exact description thereof.

The nature of my invention consists in combining revolving floats or dashers with stationary posts between which the dashers revolve.

The body of my churn is a cylinder and like other revolving churns the floats or dashers are attached firmly to an axis or shaft turned by a crank.

An end view of the interior of the churn is given in Figure I of the accompanying drawings, one of the heads or circular end pieces being supposed to be removed, showing (*a*) the shaft B and B the floats or dashers which in revolving go astride of C the posts which stand firmly in the periphery of the churn and have their place as near as practicable to the axis. These posts are round and are large in their middle portions or the parts near the shaft, and small at each end or at the parts near the periphery as shown at D, D, and D, Fig. II. The floats on the contrary are broad at their ends or at their portions near the periphery of the churn and narrow at the portion near the shaft leaving between each pair of floats an oval or elliptical passage way for the posts and the cream or butter to pass through. Their shape is shown at E and E, Fig. III. This smallness of the posts at each extremity enables them to pass through the butter with less resistance; and this wideness of the floats near the periphery and narrowness near the shaft makes them more efficient in moving and agitating the cream; in carrying more air into the cream; in reclosing the holes which the posts have cut in the butter; and in forcing the butter to pass through nearer the axis when the purchase upon it is greater.

I have mentioned the posts as being stationary; I mean that they are stationary while the cream is churned and the butter worked. But they are capable of removal as well for washing and cleansing them as to facilitate the taking out of the butter when the working is finished. To effect this, their lower ends are made to fit into and stand in holes bored into the inner surface of the periphery (as seen at F, Fig. I,) while their upper ends lean or drop into corresponding holes which are disclosed by the removal of that part of the periphery which constitutes the door (as seen at G, Fig. I). But as a reversed motion of the crank would occasionally lift the door and displace the posts, I secure their upper ends by a stiff wire skewer or bolt (as seen at Fig. IV).

As the butter while it is worked offers more resistance than the cream during churning, I furnish the sweep of the crank with a slide by which it can be elongated and a screw to tighten it when adjusted to the desired length as seen at Fig. V.

What I claim as my invention and desire to secure by Letters Patent is—

1. The combination, in a cylindrical or tub churn, of floats or paddles attached to a revolving axis, with stationary posts standing near the axis of the churn; combined and operating in the manner and for the purpose above specified.

2. The combination of dashers or paddles broad at their ends with posts small at each end and large in their middle portions, combined and operating in the manner and for the purposes above specified.

ORSAMUS R. FYLER.

Witnesses:
   J. D. BRADLEY,
   E. HOWE, Jr.